(12) United States Patent
Nitto

(10) Patent No.: US 10,965,847 B2
(45) Date of Patent: Mar. 30, 2021

(54) IMAGE OBSERVATION APPARATUS AND IMAGING APPARATUS

(71) Applicant: CANON KABUSHIKI KAISHA, Tokyo (JP)

(72) Inventor: Kiyoshi Nitto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/590,592

(22) Filed: Oct. 2, 2019

(65) Prior Publication Data

US 2020/0112660 A1 Apr. 9, 2020

(30) Foreign Application Priority Data

Oct. 3, 2018 (JP) .............................. JP2018-188414

(51) Int. Cl.
*H04N 5/225* (2006.01)

(52) U.S. Cl.
CPC ................................ *H04N 5/22525* (2018.08)

(58) Field of Classification Search
CPC ............. H04N 5/2251; H04N 5/22525; H04N 5/225251; G03B 17/02–17; G03B 13/02–16
See application file for complete search history.

(56) References Cited

U.S. PATENT DOCUMENTS

| 2005/0190278 A1* | 9/2005 | Oh ....................... H04N 5/2251 348/333.01 |
| 2015/0029380 A1* | 1/2015 | Noh ..................... H04N 5/2252 348/333.01 |
| 2017/0045802 A1* | 2/2017 | Fujii ...................... G03B 13/00 |
| 2017/0045805 A1* | 2/2017 | Sato .................... H04N 5/23293 |
| 2017/0054914 A1* | 2/2017 | Sato ................. H04N 5/225251 |
| 2017/0054915 A1* | 2/2017 | Sato ................. H04N 5/232939 |
| 2017/0054916 A1* | 2/2017 | Sato ..................... H04N 5/2251 |
| 2017/0187964 A1* | 6/2017 | Sato ..................... H04N 5/2251 |
| 2019/0107767 A1* | 4/2019 | Adachi ................. G03B 17/04 |
| 2019/0289182 A1* | 9/2019 | Kei ....................... G03B 13/02 |
| 2020/0099863 A1* | 3/2020 | Osada ............. H04N 5/225251 |
| 2020/0106938 A1* | 4/2020 | Nakashima ............. G01V 8/12 |

(Continued)

FOREIGN PATENT DOCUMENTS

JP 3677991 B2 8/2005

*Primary Examiner* — Paul M Berardesca
(74) *Attorney, Agent, or Firm* — Cowan, Liebowitz & Latman, P.C.

(57) ABSTRACT

An image observation apparatus includes a first member for fixing an image display unit, a second member for holding an observation optical system and for moving between a retracted position retracted in the first member and a protruded position protruding from the first member in an optical axis direction of the observation optical system, and a guide bar held by the first member and penetrating a guide hole portion provided in the second member in the optical axis direction. The second member has a barrel portion housing the observation optical system, and a projection portion projecting orthogonal to the optical axis direction from the barrel portion, and the projection portion has the guide hole. When the second member is at the retracted position, the projection portion and part of the image display unit overlap each other in the direction orthogonal to the optical axis direction.

9 Claims, 8 Drawing Sheets

(56) References Cited

U.S. PATENT DOCUMENTS

2020/0159086 A1\* 5/2020 Kei ........................ G03B 13/04
2020/0228691 A1\* 7/2020 Murakami ............. G03B 17/04
2020/0241394 A1\* 7/2020 Murakami ............. G03B 13/02
2020/0249547 A1\* 8/2020 Iwai ....................... G03B 17/04
2020/0252530 A1\* 8/2020 Iwai ................. H04N 5/225251

\* cited by examiner

IMAGE OBSERVATION APPARATUS AND IMAGING APPARATUS

BACKGROUND OF THE INVENTION

Field of the Invention

The present invention relates to an image observation apparatus, such as an electronic viewfinder provided in an imaging apparatus.

Description of the Related Art

Some electronic viewfinders are movable between a retracted position and a protruded or popup position relative to an imaging apparatus. The electronic viewfinder disclosed in Japanese Patent No. ("JP") 3677991 has a hole in a fixed barrel that holds a display unit, engages with the hole a guide bar held by a movable barrel movable relative to the fixed barrel, and guides the movement of the movable barrel.

However, the electronic viewfinder disclosed in JP 3677991 disposes the guide bar outside the display unit in order to secure the engagement length between the guide bar and the hole. Hence, the electronic viewfinder becomes larger.

SUMMARY OF THE INVENTION

The present invention provides a compact image observation apparatus having a good optical performance and an imaging apparatus having the same.

An image observation apparatus according to one aspect of the present invention includes an image display unit configured to display an image, a first member configured to fix the image display unit, a second member configured to hold an observation optical system and to move between a retracted position retracted in the first member and a protruded position protruding from the first member in an optical axis direction of the observation optical system, and a guide bar held by the first member and penetrating a guide hole portion provided in the second member in the optical axis direction. The second member has a barrel portion housing the observation optical system, and a projection portion projecting outwardly in a direction orthogonal to the optical axis direction from the barrel portion, and the projection portion has the guide hole. When the second member is located at the retracted position, the projection portion and part of the image display unit overlap each other in the direction orthogonal to the optical axis direction. An imaging apparatus having the above image observation apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
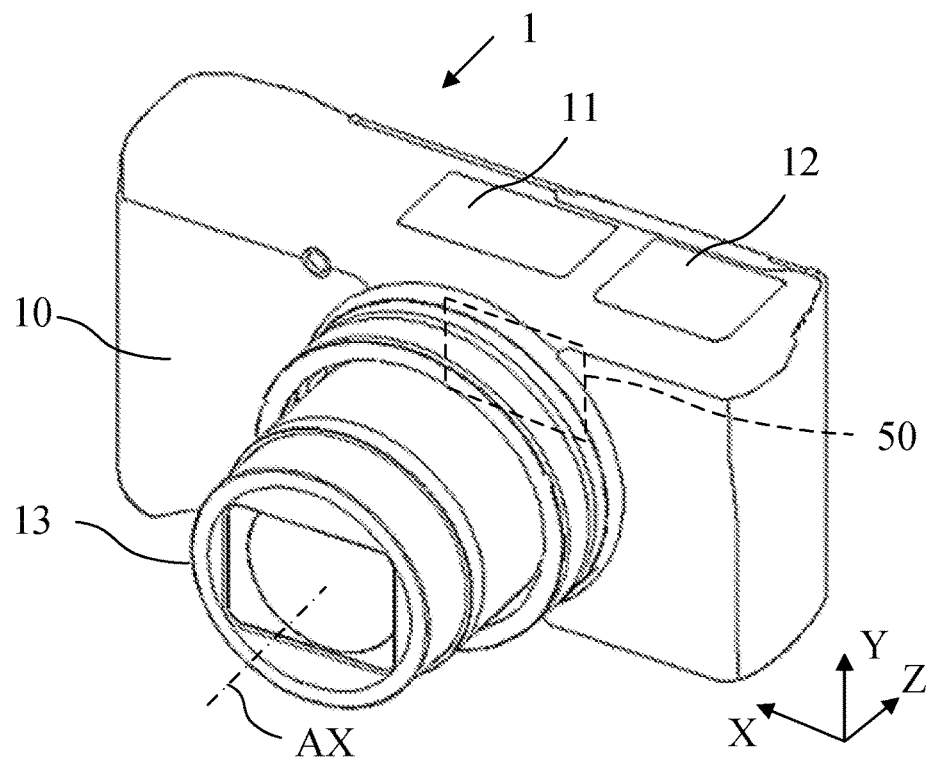
FIG. 1 is a perspective view of a digital camera according to one embodiment of the present invention.
Figure 2:
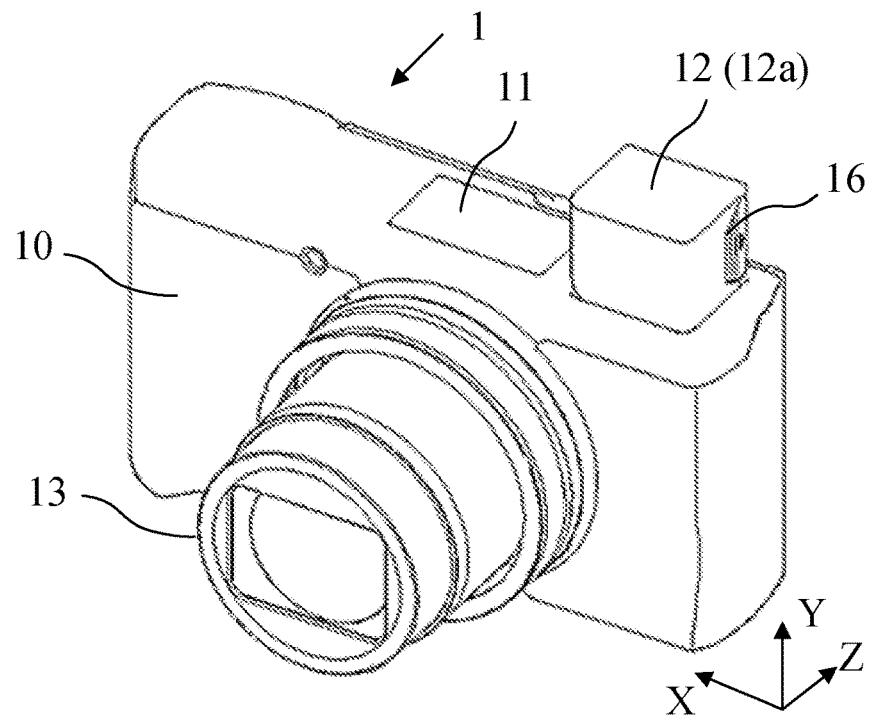
FIG. 2 is a perspective view of the digital camera in which an EVF popup unit pops up.
Figure 3:
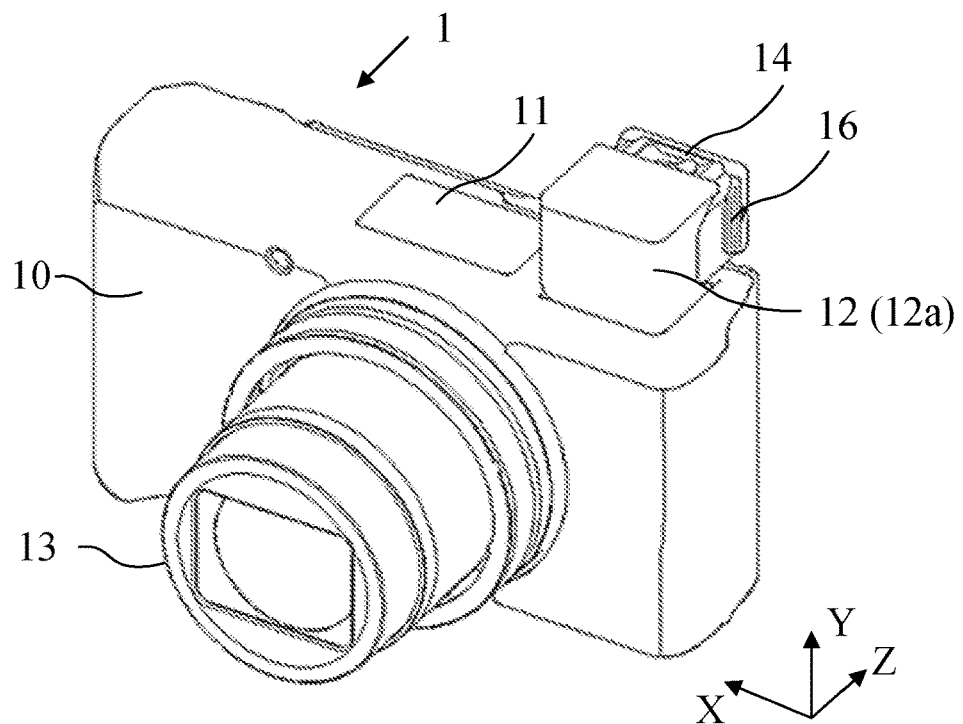
FIG. 3 is a perspective view of the digital camera in which the EVF unit pops up from the EVF popup unit.

FIGS. 1, 2, and 3 illustrate an overview of a digital camera (simply referred to as a camera hereinafter) 1 that serves as an imaging apparatus according to one embodiment of the present invention. The camera 1 includes a lens barrel unit 13 that houses an imaging optical system on the front surface of its main body (referred to as a camera body hereinafter) 10 and an image sensor 50 that captures an object image formed by the imaging optical system inside the camera body 10. In the following description, the optical axis direction in which the optical axis AX of the imaging optical system extends is set to as a Z direction, an object side in the Z direction is set to a minus side (−Z direction) or the front side, and an opposite side is set to a plus side (+Z direction) or rear side. The horizontal direction and the vertical direction orthogonal to the Z direction are set to the X direction and the Y direction, respectively.

The camera 1 further includes a flash unit 11 that can be retracted and popped up relative to the camera body 10. The camera 1 further includes an electronic viewfinder (EVF) popup unit 12 which can be retracted and popped up relative to the camera body 10. FIG. 1 illustrates the EVF popup unit 12 retracted in the camera body 10, and FIG. 2 illustrates the EVF popup unit 12 popping up from the camera body 10. As illustrated in FIGS. 2 and 3, the EVF popup unit 12 is an electronic viewfinder (EVF) unit 14 as an image observation apparatus retractable in the −Z direction and pulled up in the +Z direction relative to the popup portion 12a.

In the following description, the states (positions) illustrated in FIGS. 2 and 3 will be referred to as a retracted state (retracted position) and a use state (projected position) of the EVF unit 14, respectively.

Figure 4:
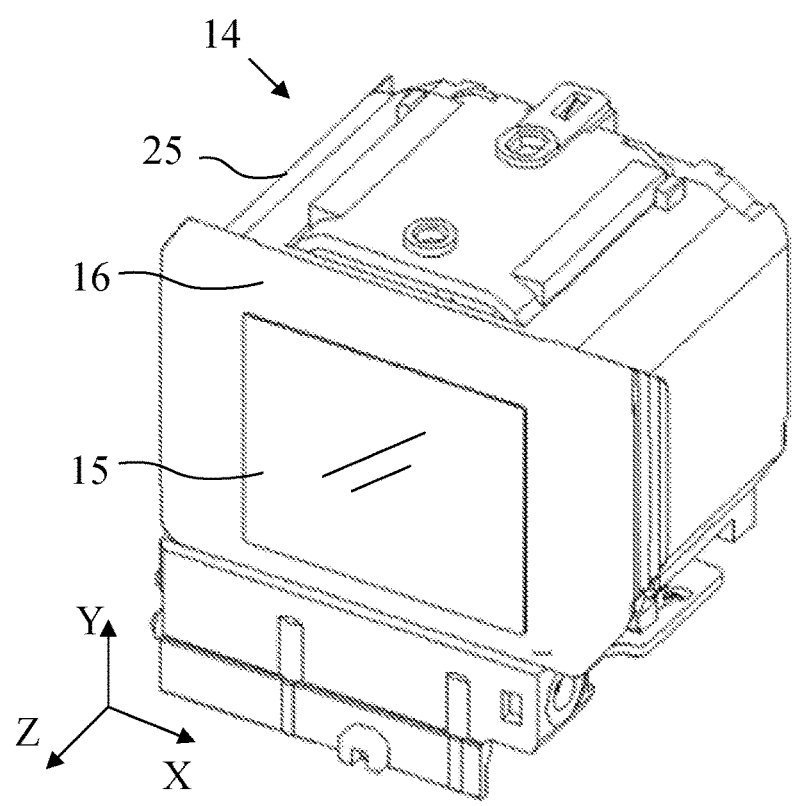
FIG. 4 is a perspective view of the EVF unit.
Figure 5:
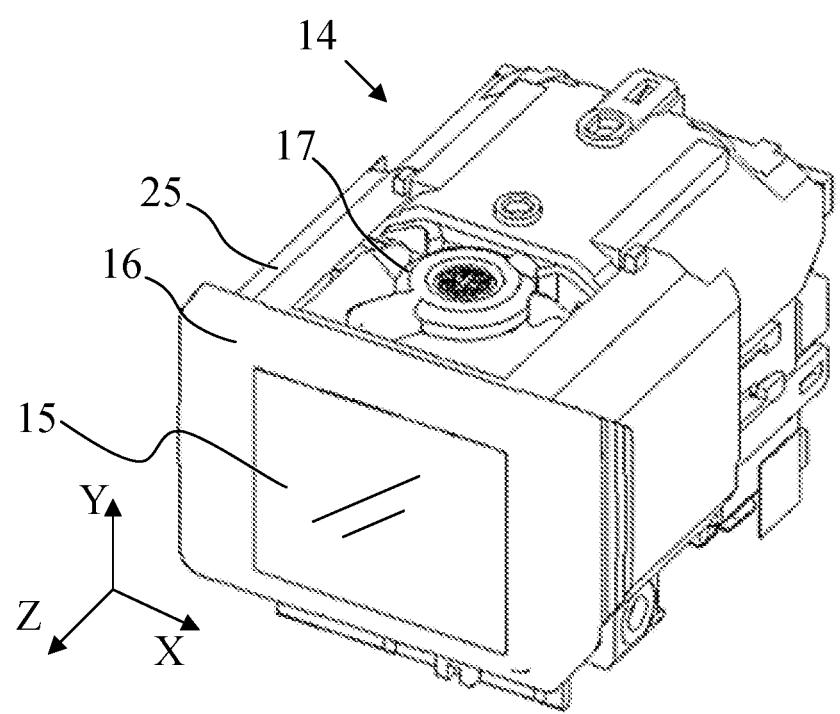
FIG. 5 is another perspective view of the EVF unit.
Figure 6:
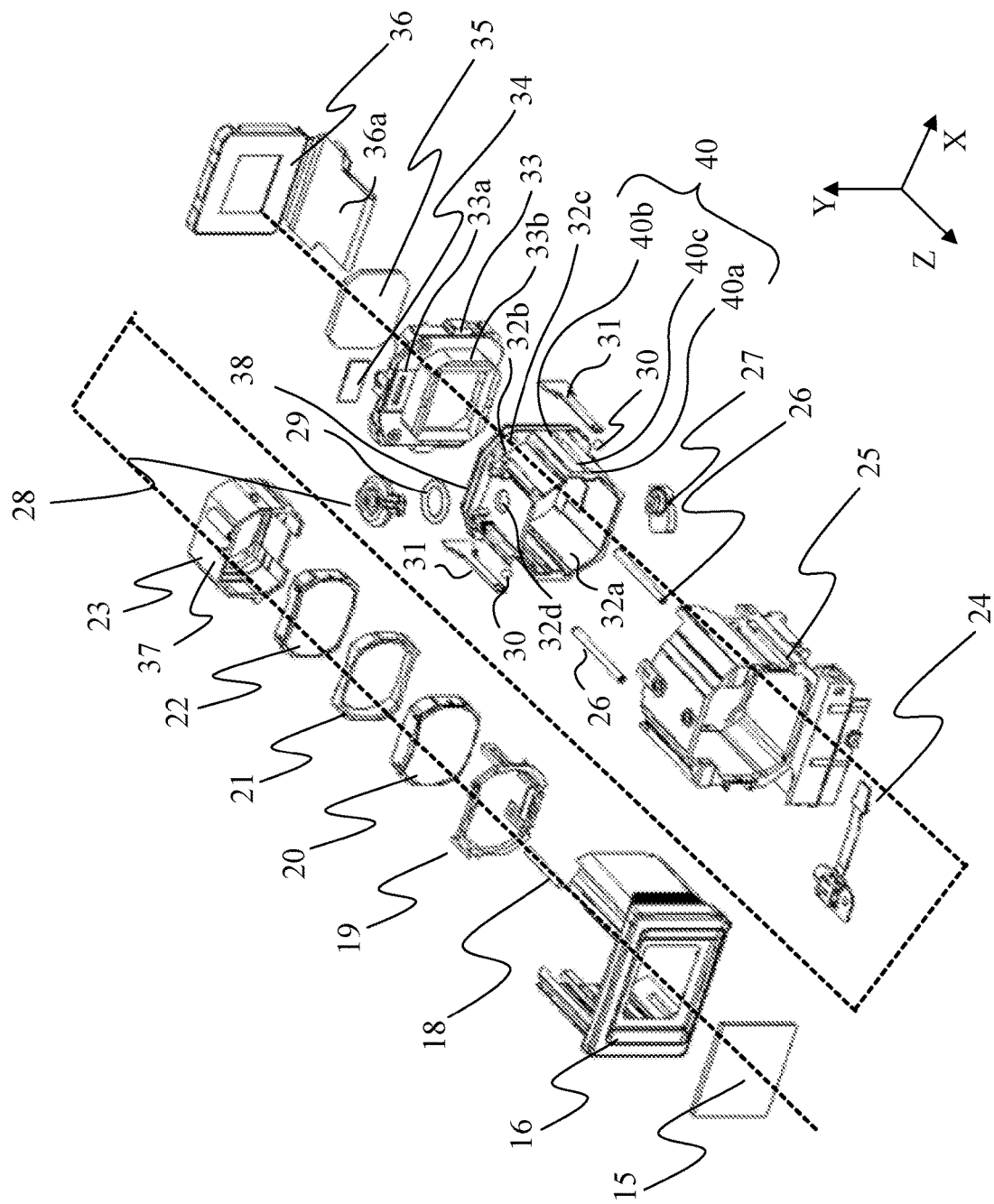
FIG. 6 is an exploded perspective view of the EVF unit.
Figure 7:
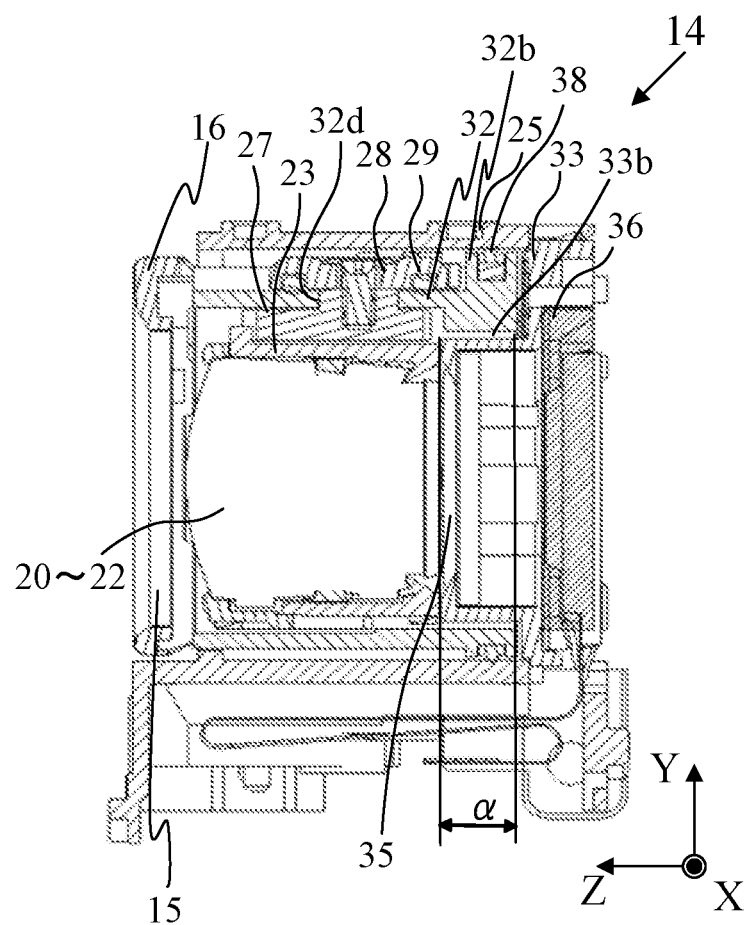
FIG. 7 is a sectional view of the EVF unit in a retracted state.
Figure 8:
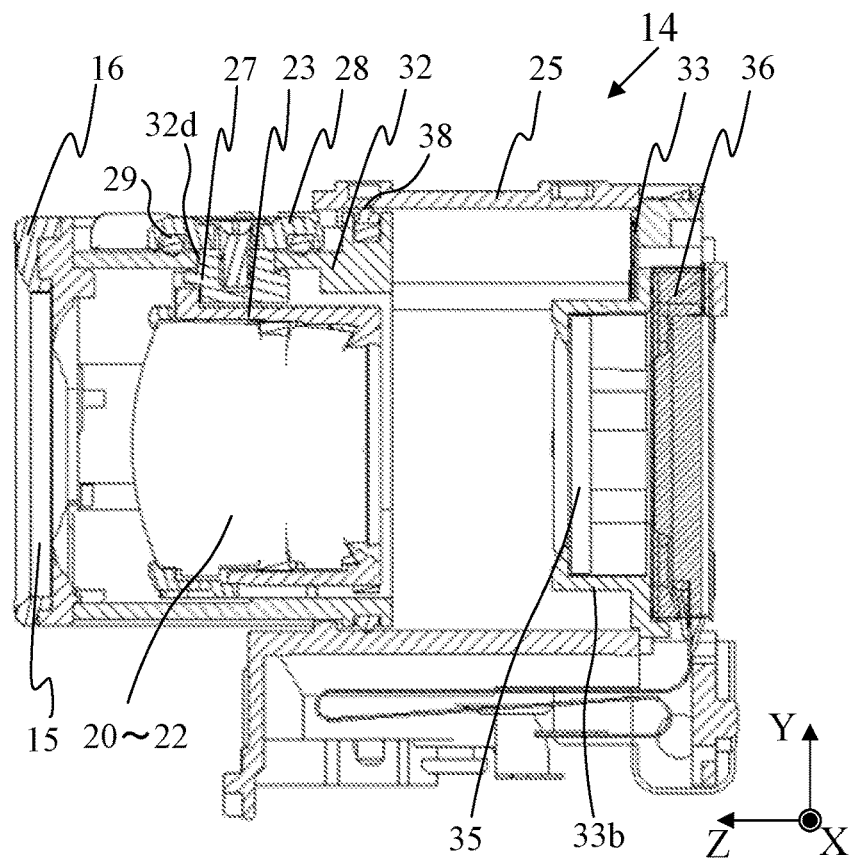
FIG. 8 is a sectional view of the EVF unit in a use state
Figure 9:
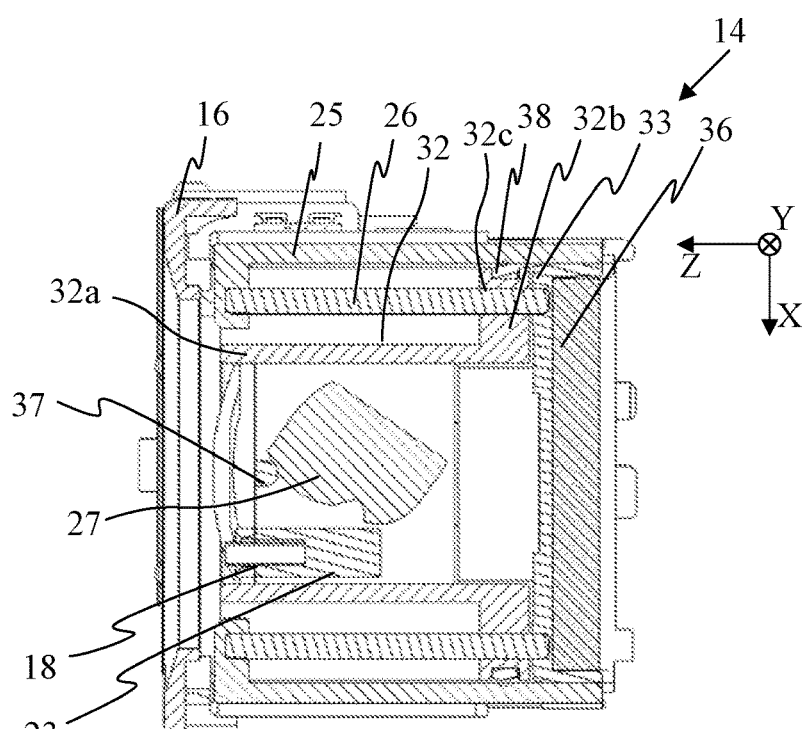
FIG. 9 is another sectional view of the EVF unit in the retracted state.
Figure 10:
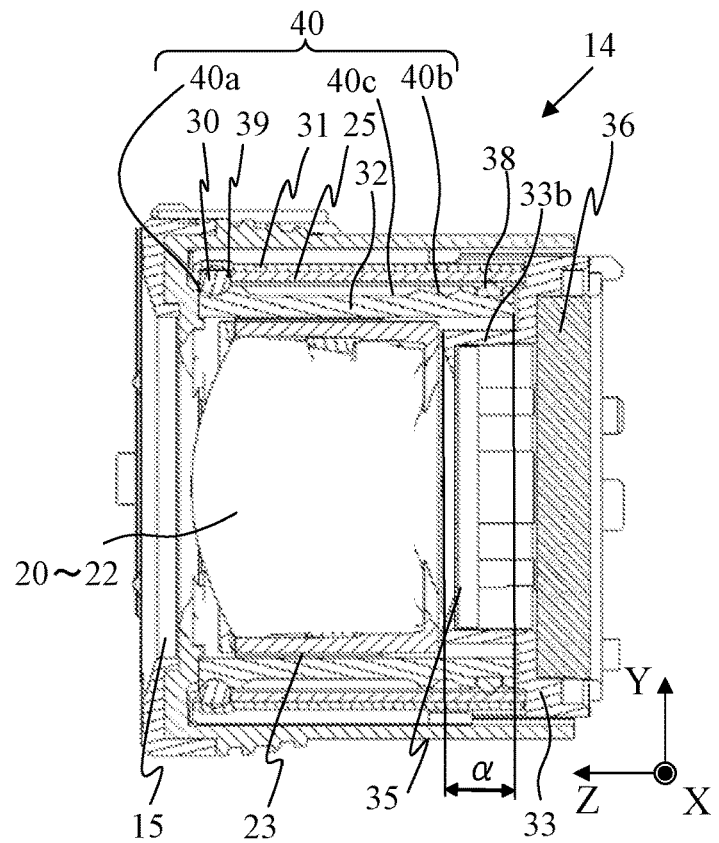
FIG. 10 is still another sectional view of the EVF unit in the retracted state.

FIG. 4 illustrates the overview of the EVF unit 14 in the retracted state, and FIG. 5 illustrates the overview of the EVF unit 14 in the use state. FIG. 6 illustrates the EVF unit 14 in an exploded state. FIG. 7 illustrates a section of the EVF unit 14 in the retracted state viewed from the side (X direction), and FIG. 8 illustrates a section of the EVF unit 14 in the use state viewed from the side. FIG. 9 illustrates a section of the EVF unit 14 in the retracted state viewed from above (Y direction) at the position of the guide bar described later, and FIG. 10 illustrates a section of the EVF unit 14 in the retracted state at the position of the ball described later.

The EVF unit 14 includes a fixed barrel 25 as a first member, a movable barrel 32 as a second member, and a lens holder 23 as a third member. The fixed barrel 25 is fixed in the popup portion 12a of the EVF popup unit 12 illustrated in FIGS. 2 and 3. The movable barrel 32 is disposed in the fixed barrel 25, and movable between the retracted position (FIGS. 7, 9, and 10) and the protruded position (FIG. 8) relative to the fixed barrel 25 in the Z direction (first direction). The lens holder 23 is movable with the movable barrel 32 in the Z direction relative to the fixed barrel 25, engaged with the lens cover 19, and configured to hold an eyepiece optical system as an observation optical system that includes a first lens 22, a mask 21, and a second lens 20. In other words, the movable barrel 32 holds the eyepiece optical system via the lens holder 23 and a diopter adjustment mechanism described later.

A panel cover 33 as a display element holder is attached (fixed) to the rear end of the fixed barrel 25. The front ends and the rear ends of the two guide bars 26 extending in the Z direction are held by the upper left and right portions of the front end portion of the fixed barrel 25 and the upper left and right portions of the panel cover 33. The movable barrel 32 includes a barrel portion 32a that houses the lens holder 23, and a projection (or extension) portion 32b that projects (or extends) outwardly from the barrel portion 32a in the X and Y directions (second direction) orthogonal to the Z direction. A guide hole portion 32c is provided at two locations of the upper side left and right of the projection portion 32b, and the guide bar 26 has penetrated through each guide hole portion 32c. Therefore, the movable barrel 32 is linearly guided in the Z direction by the guide bar 26. Since the guide bar 26 is supported on both sides by the integrally fixed barrel 25 and the panel cover 33, the movable barrel 32 is accurately movable (stably in the X and Y directions).

An eyepiece member 16 as a fourth member is attached to the front end of the movable barrel 32 by snap fitting. An eyepiece unit mainly includes the movable barrel 32, the eyepiece member 16, the lens holder 23, and the eyepiece optical system. The eyepiece unit is movable relative to the fixed barrel 25 between the retracted position (FIG. 4) and the protruded position (FIG. 5) in the Z direction.

The user can observe a finder image displayed on a display panel (which will be described later) provided inside the EVF unit 14 in the use state of the EVF unit 14 in which the eyepiece unit is pulled out to the protruded position.

A ball hole portion 39 is provided in each of left and right inner side surface portions of the fixed barrel 25, and ball groove portions 40 are provided in left and right outer side surface portions of the lens barrel portion 32a of the movable barrel 32. Each ball hole portion 39 holds a ball 30. Each ball groove portion 40 has a first concave portion 40a in which the ball 30 is fitted when the movable barrel 32 is located in the retracted position, a second concave portion 40b in which the ball 30 is fitted when the movable barrel 32 is located at the protruded position, and an intermediate groove portion 40c extending in the Z direction is provided between the first and second concave portions 40a and 40b. The two balls 30 respectively held by the two ball hole portions 39 are forced toward the ball groove portion 40 by plate springs 30 respectively attached to the left and right outer surface portions of the fixed barrel 25. The movable barrel 32 (eyepiece unit) is held at the retracted position, when the ball 30 is forced by the plate spring 30 into the first concave portion 40a, and the eyepiece unit is held in the projected position when the ball 30 is fitted in the second concave portion 40b. When the eyepiece unit moves in the Z direction between the retracted position and the protruded position, the ball 30 rotates in the ball hole portion 39 as the intermediate groove portion 40c moves.

A ring-shaped silicone rubber (sealing member) 38 is fitted in the outer circumferential portion of the projection portion 32b of the movable barrel 32. The silicone rubber 38 contacts the inner circumferential surface of the fixed barrel 25 and closes a gap between the projection portion 32b and the inner circumferential surface of the fixed barrel 25. When the movable barrel 32 moves in the Z direction relative to the fixed barrel 25, the silicone rubber 38 slides on the inner peripheral surface of the fixed barrel 25 and maintains the closed state of the gap. Thereby, dust from the outside is prevented from entering the inside of the movable barrel 32 through the gap and from adhering to the cover glass described later.

A guide groove portion configured to linearly guide the lens holder 23 in the Z direction is provided on the inner circumferential portion of the lens barrel portion 32a of the movable barrel 32. A diopter adjustment lever 28 is disposed outside the upper portion of the barrel portion 32a in the movable barrel 32, and a cam 27 is disposed inside the barrel portion 32a. The diopter adjustment lever 28 and the cam 27 are integrally rotatably connected through a hole portion 32d formed in the lens barrel portion 32a, and the cam 27 is also rotated by rotating the diopter adjustment lever 28. An O-ring 29 that contacts the outer surface of the lens barrel portion 32a and slides on the outer surface as the diopter adjustment lever 28 rotates is fitted in an annular concave portion provided in the lower surface portion of the diopter adjustment lever 28 around the rotation axis.

On the other hand, the lens holder 23 has a cam follower 37 that contacts the cam 27. The eyepiece member 16 as the fourth member is attached to the front end of the movable barrel 32 by snap fitting, and a spring 18 is disposed between the eyepiece member 16 and the lens holder 23 and forces the cam follower 37 against the cam 27. When the user rotates the diopter adjustment lever 28 to rotate the cam 27, the lens holder 23 moves in the Z direction via the cam follower 37. Thereby, the diopter can be adjusted by moving the eyepiece optical system in accordance with the user's eyesight. The diopter adjustment mechanism includes the diopter adjusting lever 28, the cam 27, and the cam follower 37.

The diopter adjustment lever 28 can be rotated by the user only when the EVF unit 14 is in use in which the eyepiece unit is located at the protruded position. This configuration can prevent the diopter from being changed before the user knows it.

The fixed barrel 25 includes a switch 24. The switch 24 is provided to detect whether the eyepiece unit is located at the protruded position or at the retracted position (whether the EVF unit 14 is in the retracted state or in the use state).

The panel cover 33 holds the display panel 36 as a display element. The display panel 36 displays a finder image generated using the output of the image sensor 50. The eyepiece member 16 and the panel cover 33 have openings for the user to observe the image displayed on the display panel 36. A transparent eyepiece glass 15 is attached to the opening in the eyepiece member 16 for preventing dust from the outside from adhering to the eyepiece optical system. A dustproof glass 35 is attached to the opening in the panel cover 33 as a transparent dustproof member that covers the display surface in order to prevent the external dust from adhering to the display surface of the display panel 36. The panel cover 33, the display panel 36, and the dustproof glass 35 constitute a display panel unit (image display unit) 44 illustrated in FIG. 11. A flexible substrate 36a extends from the display panel 36.

The thus configured EVF unit 14 can seal a space between the display panel 36 and the eyepiece glass 15 so that the dust from the outside does not enter. The panel cover 33 is provided with an opening 33a for the ventilation, and the opening 33a is covered with a ventilation sheet 34. The opening 33a and the ventilation sheet 34 are provided so as to prevent the pressure in the space sealed by the silicone rubber 38 from rapidly changing, and to prevent air containing dust from moving through the fine gap, when the user pulls or retracts the eyepiece unit and moves it relative to the fixed barrel 25.

The eyepiece unit according to this embodiment includes the movable barrel 32, the eyepiece member 16, and the lens holder 23 as three members integrally movable in the Z direction relative to the fixed barrel 25. In the movable barrel 32, the projection portion 32b having the silicone rubber 38 is provided at the rear end (closest to the image display unit) in the movable barrel 32. As illustrated in FIG. 8, the projection portion 32b located at this position enables the eyepiece unit to be pulled relative to the fixed barrel 25 and makes longest an optical overall length from the display surface of the display panel 36 to the eyepiece glass 15 when the EVF unit 14 is in use. Thereby, the optical performance of the EVF unit 14 can be improved.

Figure 11:
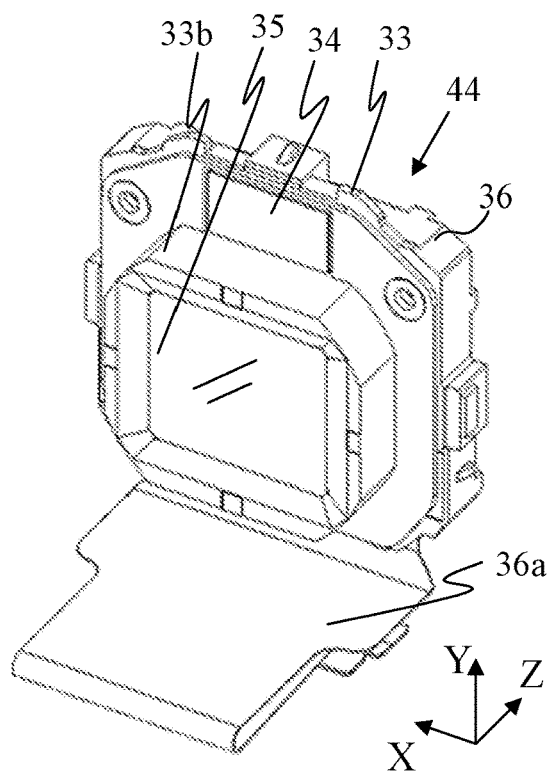
FIG. 11 is a perspective view of a display unit used in the EVF unit.

As illustrated in FIGS. 7 and 11, the panel cover 33 has a convex portion 33b which protrudes forward (to the observation optical system side) from the rear end portion that holds the display panel 36, and the dustproof glass 35 is provided in the above opening formed at the front end of the convex portion 33b. In the retracted state of the EVF unit 14 illustrated in FIG. 7, the projection portion 32b of the movable barrel 32 and the convex portion 33b of the panel cover 33 overlap each other in the Y (and X) direction by the length a in the Z direction. In other words, the projection 32b of the movable barrel 32 and the dustproof glass 35 of the display panel unit overlap each other in the Y (and X) direction. Further in other words, a portion of the movable barrel 32 is disposed around the convex portion 33b. This configuration can make compact the EVF unit 14 in the Z direction by the length a.

Figure 13:
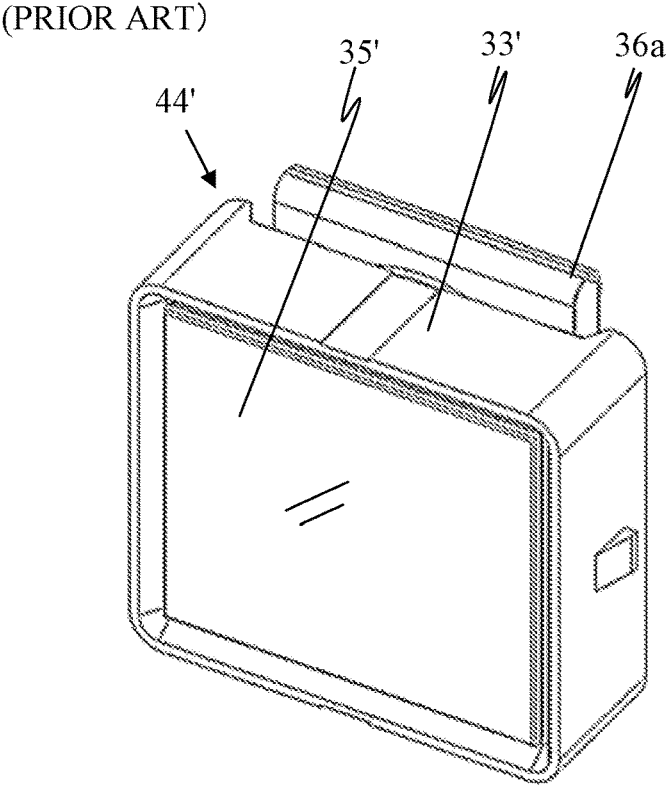
FIG. 13 is a perspective view of the conventional display unit.

FIG. 13 illustrates an overview of the conventional image display unit 44'. In the conventional image display unit 44', a panel cover 33' does not have a portion like the convex portion 33b according to this embodiment, and the shape around the dustproof glass 35' is flat. Hence, the panel cover 33' and the movable barrel cannot be arranged to overlap each other in the Y (and X) direction.

Figure 12:
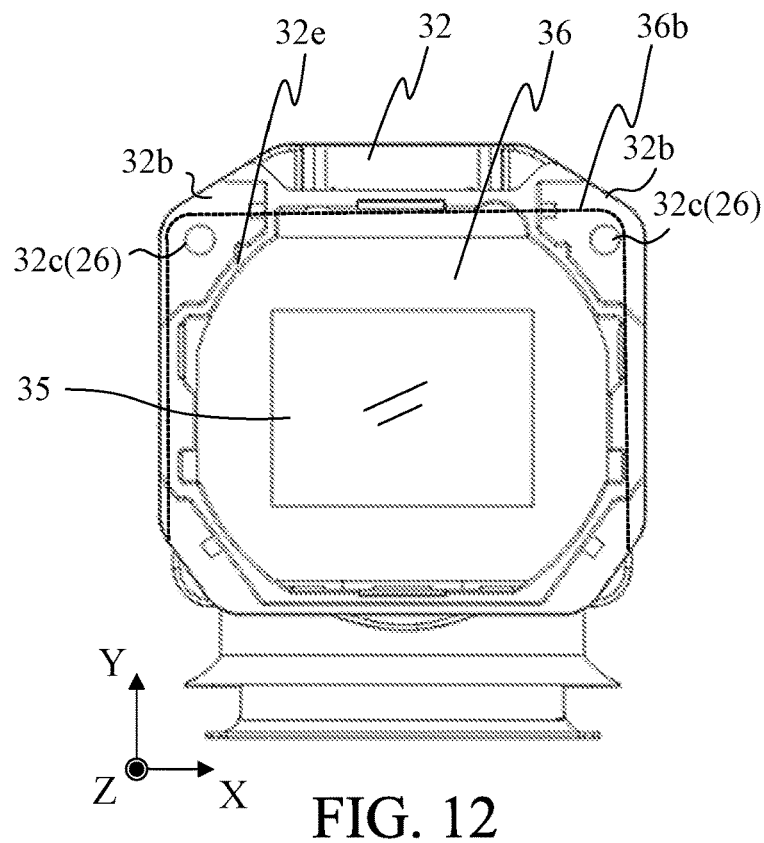
FIG. 12 is a projection view of a movable barrel and a display panel in the EVF unit viewed from an optical axis direction (+Z direction).

FIG. 12 illustrates the movable barrel 32 and the display panel 36 viewed from the +Z direction in the EVF unit 14 according to this embodiment. In this +Z direction view, an inner circumferential portion 32e of the movable barrel 32 (barrel portion 32a) is located inside the outer circumference 36b of the display panel 36 (image display unit 44) in the X and Y directions. Thereby, the eyepiece unit can be made compact in the X and Y directions.

As illustrated in FIG. 12, in the +Z direction view, the guide hole portion 32c (or the guide bar 26) provided in the projection portion 32b in the movable barrel 32 is located inside of the outer circumference 36b of the display panel 36 (image display unit 44) in the X and Y directions. Thereby, the EVF unit 14 can be made smaller.

As described above, this embodiment can realize the compact EVF unit 14 having a high optical performance in each of the X, Y, and Z directions, and this embodiment is effective in a further miniaturization of the camera 1 having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188414, filed on Oct. 3, 2018, which is hereby incorporated by reference herein in its entirety.

What is claimed is:

1. An image observation apparatus comprising:
an image display panel unit configured to display an image;
a first barrel member configured to fix the image display panel unit;
a second barrel member configured to hold an observation optical system and to move between a retracted position retracted in the first barrel member and a protruded position protruding from the first barrel member in an optical axis direction of the observation optical system; and
a guide bar held by the first barrel member and penetrating a guide hole portion provided in the second barrel member in the optical axis direction,
wherein the second barrel member has a barrel portion housing the observation optical system, and a projection portion projecting outwardly in a direction orthogonal to the optical axis direction from the barrel portion, and the projection portion has the guide hole, and
wherein when the second barrel member is located at the retracted position, the projection portion and part of the image display panel unit overlap each other in the direction orthogonal to the optical axis direction.

2. The image observation apparatus according to claim 1, wherein the image display panel unit includes a display element, and a transparent dustproof member configured to cover a display surface of the display element, and
wherein the part of the image display panel unit includes the transparent dustproof member.

3. The image observation apparatus according to claim 2, wherein the image display panel unit includes a display element holder configured to hold the display element,
wherein the display element holder includes a convex portion that protrudes to an observation optical system side of a portion holding the display element in the optical axis direction,
wherein the transparent dustproof member is provided on the convex portion, and
wherein a portion of the image display panel unit is the convex portion.

4. The image observation apparatus according to claim 1, wherein when viewed from the optical axis direction, an inner circumferential portion of the second barrel member is located inside an outer circumference of the image display panel unit in the direction orthogonal to the optical axis direction.

5. The image observation apparatus according to claim 1, wherein when viewed in the optical axis direction, the guide bar is disposed inside an outer circumference of the image display panel unit in the direction orthogonal to the optical axis direction.

6. The image observation apparatus according to claim 1, wherein the second barrel member holds the observation optical system via a cam mechanism that moves the observation optical system relative to the second barrel member in the optical axis direction for a diopter adjustment.

7. The image observation apparatus according to claim 1, further comprising a sealing member that contacts an inner circumferential surface of the first barrel member on an outer circumferential portion of the projection portion.

8. The image observation apparatus according to claim 1, wherein the projection portion is provided on a side closest to the image display panel unit of the second barrel member in the optical axis direction.

9. An imaging apparatus comprising:
an image sensor configured to capture an object image formed by an imaging optical system; and
an image observation apparatus including an image display panel unit configured to display an image generated using an output of the image sensor,
wherein the image observation apparatus further includes:
a first barrel member configured to fix the image display panel unit;
a second barrel member configured to hold an observation optical system and to move between a retracted position retracted in the first barrel member and a protruded position protruding from the first barrel member in an optical axis direction of the observation optical system; and
a guide bar held by the first barrel member and penetrating a guide hole portion provided in the second barrel member in the optical axis direction,
wherein the second barrel member has a barrel portion housing the observation optical system, and a projection portion projecting outwardly in a direction orthogonal to the optical axis direction from the barrel portion, and the projection portion has the guide hole, and
wherein when the second barrel member is located at the retracted position, the projection portion and part of the image display panel unit overlap each other in the direction orthogonal to the optical axis direction.

* * * * *